United States Patent
Drexel

[15] 3,650,505
[45] Mar. 21, 1972

[54] THERMAL VALVE

[72] Inventor: Charles F. Drexel, Rolling Hills Estates, Calif.

[73] Assignee: Tylan Corporation

[22] Filed: Mar. 2, 1970

[21] Appl. No.: 15,399

[52] U.S. Cl. ............................................. 251/11
[51] Int. Cl. .......................... F16k 31/04, F03g 7/06
[58] Field of Search ................................... 251/11

[56] References Cited

UNITED STATES PATENTS

| | | | |
|---|---|---|---|
| 3,229,956 | 1/1966 | White | 251/11 |
| 3,465,962 | 9/1969 | Matulich et al. | 251/11 X |
| 2,373,324 | 4/1945 | Martin | 251/11 X |
| 3,022,038 | 2/1962 | Roubeau et al. | 251/11 |
| 3,211,414 | 10/1965 | Webb | 251/11 |

*Primary Examiner*—Arnold Rosenthal
*Attorney*—Nilsson, Robbins, Wills & Berliner

[57] ABSTRACT

A thermal valve in which heat is utilized to expand an actuator relative to a reference member. The actuator and reference member are interconnected at one end and one or the other carries a valve head on its opposite end whereby a differential in expansion moves the valve head from its seat. Ports are provided to conduct fluid between and in contact with the reference member and actuator and a baffle is disposed between the reference member and actuator to direct the fluid along the reference member for heat transfer therewith and to effect radiant heat shielding between the reference member and the actuator.

10 Claims, 2 Drawing Figures

INVENTOR.
CHARLES F. DREXEL.
BY
Nilsson, Robbins, Wills & Berliner
Attorneys

INVENTOR.
CHARLES F. DREXEL.

3,650,505

THERMAL VALVE

FIELD OF THE INVENTION

The fields of art to which the invention pertains include the fields of fluid handling, valve and valve actuation.

BACKGROUND AND SUMMARY OF THE INVENTION

The electromechanical control and metering of fluids generally requires utilization of complex servo valves, solenoids, torque motors and/or other sophisticated transducing instruments. In order to obtain accurate metering, it is often required to utilize a needle-type valve having a sharply tapered valve head. The operation of such valves can be impeded by contaminants in the fluid stream which accumulate along the sharp surface of the valve head to clog the valve.

The present invention provides an electromechanical transducer for valve operation which does not utilize a motor, solenoid or other complex instrumentality. The transducer is inexpensive, small, lightweight and rugged and yet works precisely and stably over a large range of fluid flow. Operation is accomplished without the utilization of moving packing glands, seals or other such interface components and can be readily hermetically sealed.

The present invention provides a transducer in which a valve assembly is operated as a result of differential expansion of components of the transducer when a heating element is actuated. In accordance herewith a thermal valve is provided comprising a reference member and heat expansible actuator, one or the other of these members carrying a valve head for movement with respect to a valve seat. A heating element is disposed in heat transfer relation with the actuator to expand the actuator relative to the reference member. The actuator and reference member are interconnected in such manner that the expansion differential effects movement of the valve head-carrying member to move the valve head out of or into its seat.

Means are provided defining inlet and outlet ports to conduct fluid between and in contact with the reference member and actuator and through the valve assembly. A baffle is disposed between the reference member and actuator to direct fluid along the reference member for efficient heat transfer therewith. The baffle also effects radiant heat shielding between the reference member and actuator to enhance the expansion differential of these components. A housing is provided to enclose the valve which can be hermetically sealed to prevent fluid flow except through the inlet and outlet ports and thermal insulation can be provided within the housing.

With respect to specific construction in one embodiment, the actuator is tubular and formed long in proportion to its width. The reference member is also in the form of an elongate, wider tube disposed coaxially about the actuator and is secured to the actuator at one end thereof spaced from the valve assembly. A resistance wire is twisted and disposed within the actuator as a heating element. In another embodiment, the actuator is in tubular form and disposed coaxially about a reference rod. Resistance wire is coiled about the actuator as a heating element. In both cases a baffle tube is disposed coaxially between the actuator and reference member.

A control signal to amplified and applied to the heating element so as to heat the actuator in proportion to the signal. Because a substantial signal causes only slight expansion, and because operation of the valve is frictionless, the valve stroke can be made very small, on the order of microinches. Accordingly, the valve seat can be made relatively large and the valve head relatively flat, minimizing the danger of clogging. Since the heater element directly couples to an output amplifier, there is no wear on the valve and virtually zero friction. Precise operation is obtained by forming the actuator and reference member of material having substantially identical coefficients of heat expansion and with substantially identical effective lengths.

DETAILED DESCRIPTION

As required, detailed illustrative embodiments of the invention are disclosed herein. However, it is to be understood that these embodiments merely exemplify the invention which may take many different forms that are radically different from the specific illustrative embodiments disclosed. Therefore, specific structural and functional details disclosed herein are not to be interpreted as limiting, but merely as a basis for the claims which define the scope of the invention.

Figure 1:
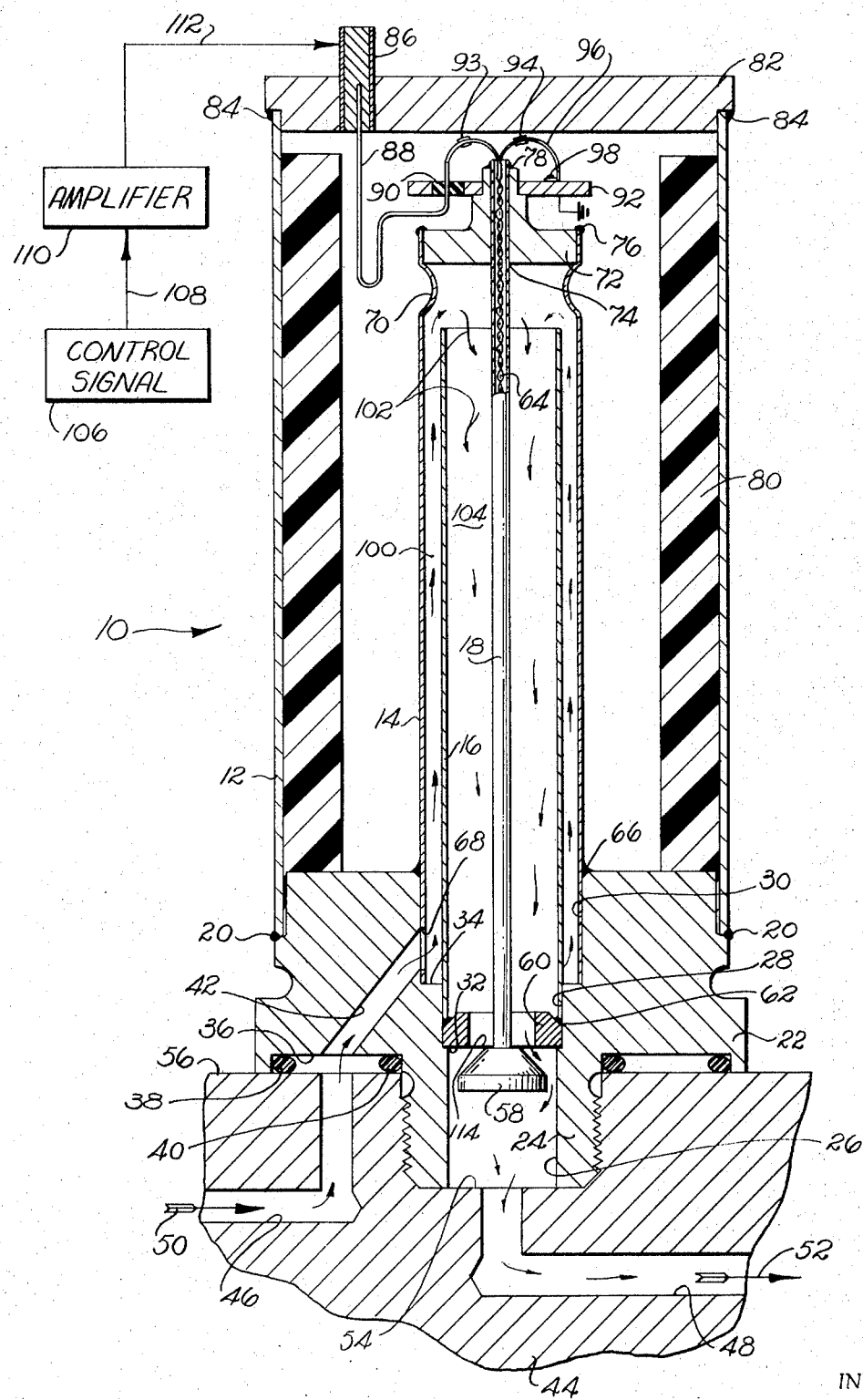
FIG. 1 is a partially schematic cross-sectional representation of a valve constructed in accordance with the present invention.

Referring to FIG. 1, the thermal valve 10 therein illustrated includes a number of concentric tubular members 12, 14, 16, and 18 of stainless steel which have various functions as hereinafter detailed. The outer tubular member 12 constitutes a housing for the device and is threaded and then welded or brazed, as at 20, to a circular base 22. The base 22 is formed centrally with a depending threaded stud 24 and defines a bore 26 therethrough which is formed with progressively increased diameter portions 28 and 30 to define stepped shoulders 32 and 34 spaced from the bottom of the stud 24. The bottom surface of the base 22 defines an annular groove 36 around the stud 24 in which are disposed a pair of concentric metal O-rings 38 and 40. A conduit 42 is formed through the base 22 from the groove 36 into the uppermost increased diameter portion 30 of the bore 26. The valve 10 is designed to control or meter the flow of hydraeric fluid through a member 44 which defines passageways 46 and 48 for the ingress and egress respectively of the fluid as indicated by the arrows 50 and 52. The member 44 is formed with a threaded pocket 54 for close fitting female engagement with the stud 24. The ingress passageway 46 is formed through the surface 56 of the member 44 into the annular base groove 36. The egress passageway 48 is formed to open into the base bore 26 to receive fluid from the valve 10. When the stud 24 is fully threaded into the pocket 54, the metal O-ring seals 38 and 40 effectively prevent escape of fluid from the ingress passageway 46.

The innermost tubular member 18 is a thin elongate tube having, in this illustration, an outer diameter of 0.015 inches and an inner diameter of 0.010 inches. The tube 18 carries a valve head 58 at its lower end which is formed to matingly engage a valve seat 60. The valve seat 60 is welded or brazed as at 62 within the bore 26 abutting the shoulder 32. The tube 18 constitutes the actuator of the valve 10 and has disposed therein a heater element in the form of resistance wire 64 which has been doubled and twisted and dropped down into the tube 18 as shown at the broken away portion in the drawing. As will be detailed hereinafter, heating of the resistance wire 64 effects an expansion or elongation of the actuator 18 which causes downward movement of the valve at 58 away from its seat 60.

The next innermost tube 16 constitutes a baffle tube, the function of which will be detailed hereinafter. The baffle tube 16 is disposed coaxially on the actuator tube 18 and welded or brazed with the valve seat 60 to the base 22 as at 62.

Next, the tube 14 is disposed coaxially around the baffle tube 16 and constitutes a reference tube as hereinafter explained. The reference tube 14 is disposed with its lower end resting on the shoulder 34 and is brazed or welded as at 66 to the base 22. The lower end of the reference tube 14 defines an opening 68 which is positioned coincident with the base conduit 42. The upper end of the reference tube 14 is formed with an indentation 70 to support a closure member 72 thereat. The closure member 72 is formed with a central aperture 74 through which the actuator tube 18 extends. The closure member 72 is welded or brazed as at 76 to the reference tube 14 and to the top of the actuator tube 18 as at 78, such welding or brazing being effected to hermetically seal the engaging edge of the closure member with the respective edges of the reference tube 14 and actuator tube 18.

A close fitting tube 80 of styrofoam is disposed within the tubular housing 12 and serves as thermal insulation for the valve. The open top of the tubular housing 12 is fitted with a lid 82 which is welded or brazed as at 84 to the housing 12. The entire contact surfaces between the housing 12 and the lid 82 and base 22 is welded or brazed so as to effect external hermetic sealing of the valve.

The lid 82 is formed with an electrical terminal 86 therethrough. Prior to welding or brazing of the lid 82, an electrical wire 88 is brought inwardly from the terminal 86, through an insulator 90 in a header 92, and soldered at 92 to one end of the resistance wire 64. The other end of the resistance wire 64 is soldered at 94 to an electrical lead 96 which is soldered at 98 to the header 92 which in turn is grounded by its connection to the closure member 72 affixed to the reference tube 14.

In operation, the thermal valve 10 is secured to the member 44 by threading of the stud 24 into the threaded pocket 54 until the concentric O-rings 38 and 40 are compressed sufficiently to effect hermetic sealing of the passageway 46. As a result of its disposition around the stud 24, the innermost O-ring 40 also effects hermetic sealing of the egress passageway 48.

Liquid or gas to be controlled or metered is fed through the ingress passageway 46 into the annular groove 36 and from there through the valve base conduit 42 into the space 100 defined between the reference tube 14 and the baffle tube 16. The fluid then flows over the top of the baffle tube 16 as shown by the arrows 102, and travels through the annular passage 104 defined between the inner surface of the baffle tube 16 and the outer surface of the actuator tube 18, impinging against the valve head 58.

Initially, the valve head 58 is closed against its seat 60, preventing further travel of the fluid. In order to meter the fluid into the egress passageway 48, a control signal, indicated diagrammatically at 106 is fed along a line 108 to an amplifier 110 and from there along a line 112 directly to the electrical terminal 86 and via the electrical wire 88 to the resistance wire 64 within the actuator tube 18. By such application of an electrical signal, the resistance wire 64 heats up to increase the temperature of the actuator tube 18 relative to the temperature of the reference tube 14 in proportion to the signal magnitude. Such heating effects a differential expansion between the actuator tube 18 and the reference tube 14 so that the actuator tube 18 expands with respect to the reference tube 14, such expansion causing the length of the actuator tube 18 to increase to carry the valve head 58 away from its seat 60. At this point, the fluid can escape through the opening defined between the displaced valve at 58 and the seat 60, as indicated by the arrows 114, into the egress passageway 48 and from there to its predetermined destination. As a signal of greater magnitude is transmitted, the temperature of the actuator tube 18 rises as does the extent of expansion, resulting in the metering of a proportionally greater amount of fluid.

The baffle tube 16 is disposed relatively close to the inner surface of the reference tube 14 so as to direct the fluid along the reference tube 14 thereby obtaining efficient heat transfer between the fluid and reference tube 14. If the initial condition of the valve is such that the valve head is spaced from its seat, then the fluid effects a temperature equilibrium between the reference tube 14 and actuator tube 18. After the actuator tube 18 is heated, radiation therefrom would tend to heat up the reference tube 14 with a resultant decrease in temperature differential as a function of time. However, the baffle tube 16 functions also as a radiant head shield which, together with the flow of fluid first past the inner surface of the reference tube, results in an equilibrium being rapidly established whereby the temperature differential is accurately proportional to the applied control signal regardless of time during any period of continuous operation of the valve.

It should be noted that the magnitude of heating required for proper operation of the valve is largely independent of the temperature of the fluid being metered. Opening of the valve is proportional to the temperature difference between the reference and actuator tubes and the coefficient of expansion of the actuator. The utilization of a baffle tube 16 as described performs the several functions of directing inlet fluid against the reference tube 14, shielding the reference tube 14 from radiation and prevents heat transfer between the actuator and reference tube by natural convection at low flow rates. The space 100 should be small to achieve a high heat transfer coefficient between the inlet gas and reference tube 14 so as to minimize power requirements. On the other hand, the space 104 is a compromise in that it must be large to reduce heat transfer between the actuator 18 and fluid, also in order to minimize power requirements, but is must be small enough to permit sufficiently rapid heat transfer from the actuator 18 when signal power is removed to effect useful response.

Except for the electrical wiring and leads 88, 94, 96, and resistance wire 64, which are of standard materials for those functions, all the components of the valve 10 can be constructed of stainless steel and thus a corrosion resistance valve is provided. However, any material which is compatible with the fluid being metered can be utilized provided appropriate expansion coefficients are chosen for the various components. In this regard, if the temperature coefficient of linear expansion of the material used for the actuator tube 18 is substantially identical to the coefficient of the material used for the reference tube 14, the relative positions of the valve head 58 and seat 60 will be the same regardless of the temperature of the fluid being metered. This is particularly important if it is desired that the valve head 58 be initially closed against its seat 60. Furthermore, in order to obtain uniformity in the spacing between the valve head 58 at its seat 60 over a wide range of fluid temperatures, the actuator tube 18 and reference tube 14 should have substantially identical effective lengths. This is readily accomplished by the foregoing structure wherein the base 22 as well as other components are manufactured of material identical to the actuator tube 18 and reference tube 14, since as a result of the welding or brazing of the reference tube 14 to the base 22, the effective length of the reference tube 14 and the actuator tube 18 are inherently identical.

Figure 2:
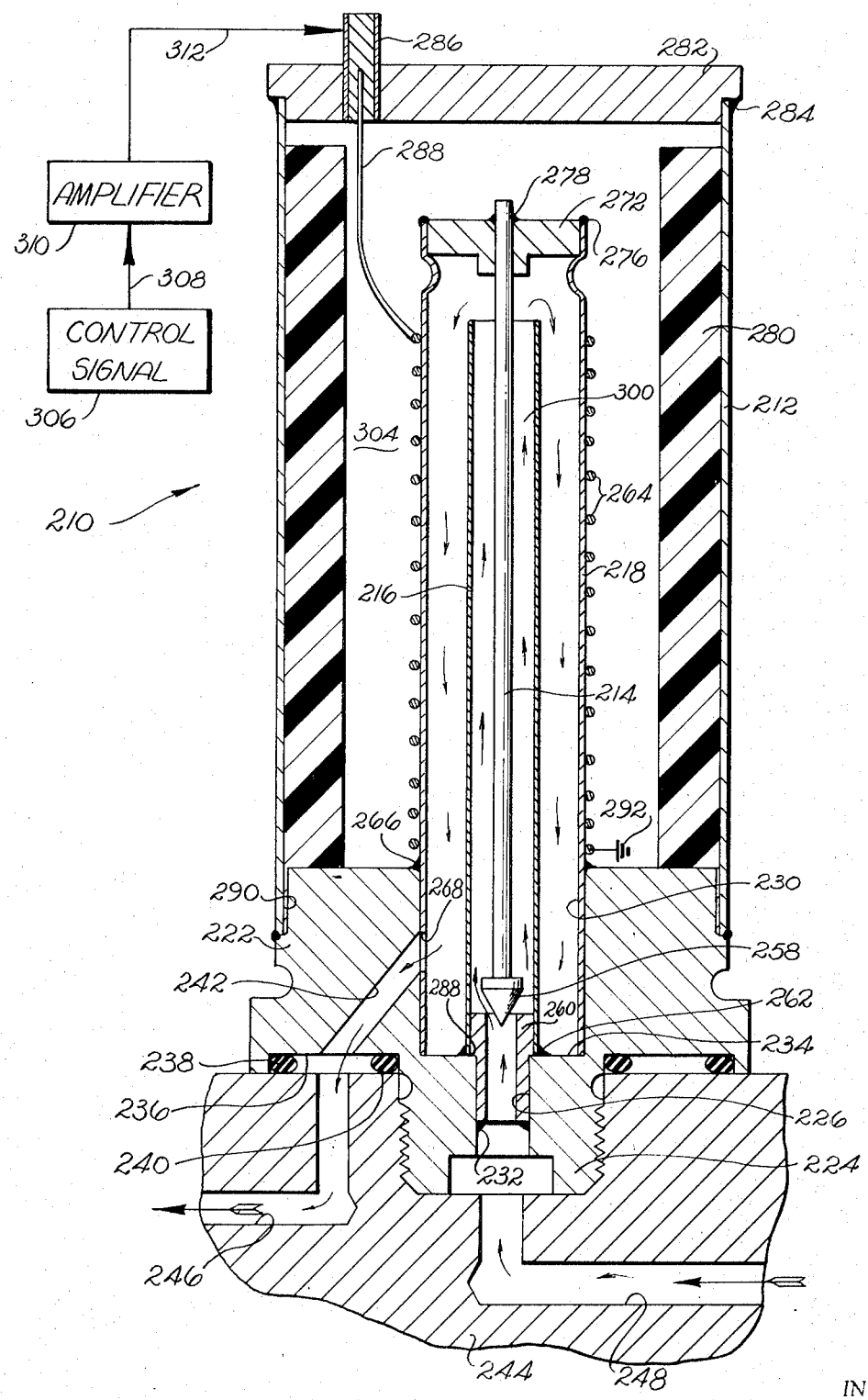
FIG. 2 is a partially schematic cross-sectional representation of another valve constructed in accordance with the present invention.

Referring now to FIG. 2, there is illustrated a thermal valve 210 of alternative construction but which functions in the manner of thermal valve 10 of FIG. 1 by generation of an expansion differential between an actuator member and a reference member. In this particular construction, the reference member is in the form of a thin elongate rod 214 and carries the valve head 258 at its lower end. In contrast to the thermal valve 10 of FIG. 1, in this embodiment the actuator is disposed exteriorially of the reference tube 214 and is in the form of an elongated tube 218 concentrically disposed about the reference tube 214. A heating coil of resistance wire 264 is wound around the actuator tube 218 and is connected at one end by electrical wiring 288 to an electrical terminal 286, and at its other end to a ground, indicated schematically at 292.

The reference rod 214 can be hollow in the manner of the actuator tube 18 of FIG. 1, or may be solid throughout, and is welded or brazed as at 278 to a closure member 272 which, in turn, is welded or brazed as at 276 circumferentially to the actuator tube 218. An annular base 222 is formed with a dependent threaded stud 224 and defines a bore 226 therethrough. The bore is formed with an increased diameter upper portion 230 whereby a shoulder 234 is provided spaced from the bottom of the base 222. A baffle tube 216 is disposed on the shoulder 234 and welded or brazed thereto as at 262. A valve seat 260, having a decreased diameter lower portion forming a shoulder 228, is disposed with the shoulder 228 bearing against the base shoulder 234 and is welded or brazed as at 232 to the base 222.

In other respects, the valve 210 is constructed similarly to the valve 10 of FIG. 1. Thus, an annular groove 236 is formed on the bottom surface of base 222 around the stud 224 and carries concentric O-rings 238 and 240. A conduit 242 is defined through the base 222 into the bore 226. The actuator tube 218 is dimensioned to slide into the bore 226 concentrically about the baffle tube 216, resting upon the shoulder 234. An opening is defined through the actuator tube 218 spaced from the shoulder 234 so as to coincide with the base circuit 242. The actuator tube 218 is then welded or brazed as at 266 to the base 222 to effect a rigid, hermetically sealed structure.

A styrofoam insulating tube 280 is disposed on the support 222 concentrically about the actuator tube 218. The support 222 is provided with a threaded outer surface 290 which is engaged by the internal threaded surface along the lower end of the tubular housing 212. A lid 282 is disposed atop the housing 212 and hermetically sealed to the housing by welding or brazing as at 284. The resistance wire 264 is connected at one end to an electrical terminal 286 formed through the lid 282 by means of electrical wiring 288 and is connected at the other end thereof to ground, indicated schematically at 292.

A member 244 is provided with is similar in construction to member 44 depicted in FIG. 1 having passageways 246 and 248 defined therethrough in the manner of the member 44 so that the passageway 248 is in communication with the base bore 226 and the passageway 246 is in communication, via the groove 236, with the base conduit 242. However, in this embodiment, the fluid to be metered is conducted initially through the passageway 248 into the valve 210 and is conducted from the valve 210 by means of the passageway 246 so that the flow of fluid through the member 244 is in a direction opposite to that of the flow of fluid through the member 44.

In operation, a control signal is applied as indicated at 306 over a line 308 to an amplifier 310 and from there over a line 312 to the electrical lead 286 so as to heat the resistance wire 264, thereby causing the actuator tube 218 to expand. Since the reference rod 214 is rigidly connected at its upper end to the actuator tube 218, by means of the closure member 272, the result of expansion of the actuator tube 218 is that the reference rod 214 moves upwardly, carrying the valve head 258 out of its seat 260. In this embodiment, the fluid flows from the passageway 258 past the valve head 258 and is directed by the baffle tube 216 against the surface of the reference rod 214, and from there travels into the space 304 between the baffle tube 216 and in the surface of the actuator tube 218, into the conduit 242 and out through the passageway 246 to its destination.

Note that in this embodiment, the baffle tube 216 is formed more narrowly than the baffle tube 16 depicted in FIG. 1 so as to define a relatively close space 300 with the outer surface of the reference tube 214, thereby enabling efficient scrubbing of the reference tube 214 for better heat transfer.

The embodiments depicted in FIGS. 1 and 2 have certain similarities. Thus, in both embodiments a reference member and a heat expansible actuator member are provided. In the embodiment of FIG. 1 the valve head is carried by the expansible reference member while in the embodiment of FIG. 2 the valve head is carried by the reference member; however, in each case the valve head is moved as a result of the establishment of a differential in expansion between the actuator and the reference member, the actuator being identified as such merely on the basis of it being the component that is more greatly expanded than the other components of the valve. The considerations with respect to materials of construction and effective lengths of the various components are the same for the valve 210 of FIG. 2 as they are for the valve 10 of FIG. 1. By the utilization of the foregoing construction, a valve head 58 or 258 can be utilized which has relatively flat tapers, thereby minimizing any tendency to clog.

While each of the above embodiments was described with a valve assembly in which the valve is caused to open by heating of the actuator, the present invention also contemplates the utilization of a valve head in which closure of the valve is effected by expansion of the actuator, although modifications may be required, such as spring-loaded components for purposes of safety. It should be noted that with the embodiments illustrated, as long as the reference tube and actuator are maintained at the same temperature, no stress can be applied to cause damage to the valve head or valve seat.

By utilization of the innovational designs described herein, a valve is provided which is small, lightweight, rugged and inexpensive. The valve works in a stable and precise manner over a very large range of fluid flows. For example, units have been built which can control the flow of from 50 to 3,000 cubic centimeters per minute of gaseous fluid. The valve is designed for screw-in utilization so that units can be replaced very readily. The valve is hermetically sealed and requires no moving packing glands or the like and can be thus used for the control and metering of dangerous or exotic gases such as silane, arsine, or the like. Operation is frictionless allowing the valve stroke to be made very small, on the order of microinches, enabling the utilization of a flat valve head to minimize the chances of clogging. The present construction requires only little power, the heating element directly coupling to a control signal output amplifier. Thus, there has been provided an electromechanical transducer without a motor or solenoid in which there is virtually no wear or friction.

The foregoing exemplary embodiments have been described as controlling fluid from the reference tube to the actuator. However, it should be recognized that a reversal of this arrangement can be utilized for specific desired purposes. Thus, by reversing the fluid flow with any of the foregoing embodiments, convective heat transfer from the actuator to the reference tube is magnified. This provides a dynamic lead function upon change in fluid flow. For example, in systems where the control signal is a function of fluid flow, the magnification can effect a movement of the valve head prior to control signal therefor. Other examples will now be evident to those skilled in the art.

I claim:

1. A thermal valve comprising:
    an elongated reference member and an elongated heat-expansible actuator member, each of substantially identical coefficients of heat expansion, one of said members being disposed coaxially about the other of said members;
    a valve assembly having a movable component operatively associated with said other member;
    an elongated baffle coaxially between said actuator member and said reference member;
    means including inlet and outlet ports for directing fluid through said valve assembly in one direction in contact with and from said reference member on one side of said baffle to another direction to contact said actuator member on the other side of said baffle;
    means for heating said actuator member whereby to effect a differential in expansion between said actuator member and said reference member; and
    means for rigidly interconnecting said actuator member and said reference member at a common end spaced from said valve assembly whereby said expansion differential effects movement of said one member to operate said valve assembly.

2. The invention according to claim 1 including means for generating a control signal for said valve, means for amplifying said control signal, and means for applying said amplified signal to said heating means whereby to heat said actuator member in proportion to said signal.

3. The invention according to claim 1 in which said baffle is formed to direct fluid along said reference member for heat transfer therewith.

4. The invention according to claim 1 in which said baffle is formed to effect radiant heat shielding between said actuator member and said reference member.

5. The invention according to claim 1 in which said baffle is formed to reduce convective heat transfer between fluid in said valve and said actuator.

6. The invention according to claim 1 including means for hermetically sealing said valve whereby to prevent fluid flow thereinto except through said ports.

7. The invention according to claim 1 in which said valve assembly comprises a valve head carried by said other member and a valve seat for said valve head.

8. The invention according to claim 1 in which said reference member and said actuator member have substantially identical effective lengths.

9. The invention according to claim 1 in which said one member comprises a tube disposed coaxially about the other of said members.

10. The invention according to claim 9 in which said baffle is an elongated tube coaxially between said actuator member and said reference member.

* * * * *